W. H. KRUG.
COUPLING FOR ANTISKID ATTACHMENTS.
APPLICATION FILED JULY 18, 1917. RENEWED MAY 8, 1919.
1,307,055. Patented June 17, 1919.
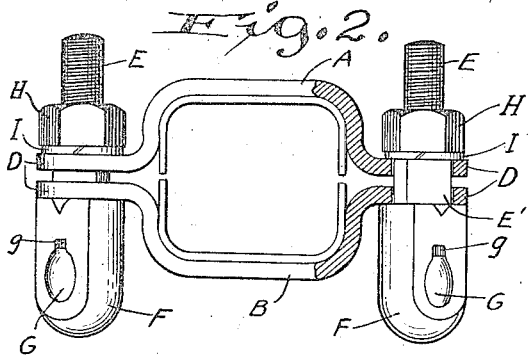
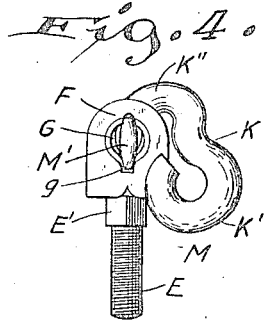
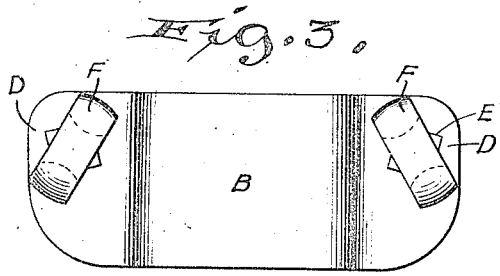
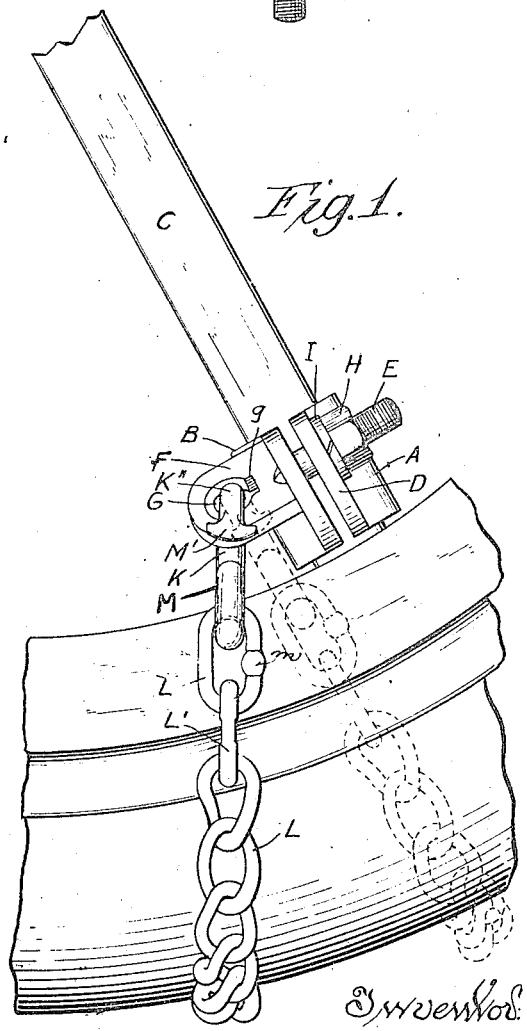

UNITED STATES PATENT OFFICE.

WILLIAM H. KRUG, OF OSHKOSH, WISCONSIN.

COUPLING FOR ANTISKID ATTACHMENTS.

1,307,055.  Specification of Letters Patent.  Patented June 17, 1919.

Continuation in part of application Serial No. 163,562, filed April 21, 1917. This application filed July 18, 1917, Serial No. 181,285. Renewed May 8, 1919. Serial No. 295,697.

*To all whom it may concern:*

Be it known that I, WILLIAM H. KRUG, a citizen of the United States, residing at Oshkosh, county of Winnebago, and State of Wisconsin, have invented new and useful Improvements in Couplings for Antiskid Attachments, of which the following is a specification.

My invention relates to improvements in couplings for anti-skid attachments for motor driven vehicles.

My invention relates particularly to that type of anti-skid attachments in which short chains are passed over the tread portion of a tire, and detachably connected at their respective ends with the spoke or felly of a wheel.

The object of my invention is to provide improved means for coupling the ends of the chain with a support connected with the wheel and mounted either upon the tire or the felly. More particularly, my object is to provide a form of coupling which will not accidentally disengage, but which can be readily and quickly manipulated into and out of coupling position; also to provide means whereby the coupling members may be quickly replaced with minimum expense and loss of time if broken or damaged.

In the drawings:

Figure 1 is a side elevation of a fragment of a vehicle wheel provided with a set of coupling members embodying my invention.

Fig. 2 is a view of the set of spoke engaging clamping plates and bolts shown in Fig. 1, as seen from the margins of the plates nearest the hub, said plates being shown partially in section to expose one of the clamping bolts.

Fig. 3 is a side view of the same.

Fig. 4 is a detail view of a pair of associated coupling members, as they appear when being manipulated into engaging position, or from such position to releasing position.

Like parts are identified by the same reference characters throughout the several views.

Referring to Figs. 1 and 2, it will be observed that I have provided a set or pair of ordinary clamping plates A and B, adapted to embrace the spoke C of a vehicle wheel. These clamping plates are each provided with ears D at their respective ends, through which the clamping bolts E are passed. All of these parts may be of ordinary construction, except as follows:

Instead of providing the bolts E with ordinary heads, I provide them with special coupling heads F provided with apertures G, the walls of which are provided with a notch g, preferably located at the inner side of the opening, and substantially in line with the axis of the bolt E. The aperture G and notch g comprise a key hole slot. A portion E' of each bolt is squared, and is adapted to fit a squared socket in the coupling member B, or in both coupling members A and B, if desired. The threaded end of the bolt is provided with a nut H having a lock washer I.

By employing the squared portion E' of the bolt E to hold the bolt from rotating, it is obvious that the coupling head or member F may be rigidly held in the same relative position with reference to the clamping members and to the felly. The openings in the ears D are so formed that the coupling heads F will be held in planes which are oblique to the radial planes, which include the side faces of the felly, the planes which include the coupling members F extending inwardly toward the spoke on the hub side, and outwardly toward the side of the felly on the felly side.

Co-acting coupling members K are employed to connect the ends of the chain L with the coupling members F. The chains are preferably provided, at each end, with one or more straight links L', adapted to interchangeably receive the hook shaped end portion K' of coupling member K. The other end portion K'', of coupling member K, is also hook shaped, and the extremities M and M' of these hook shaped portions, K', K'', are adapted to be manipulated into engagement with the links L' and member F, respectively. The extremity M' is in the form of a lateral projection extending transversely to the axis of the coupling member, and adapted to perform the function of a cross head to keep the coupling member from disengaging from the other member of the coupling with which it is associated. The extremities M may have any form adapted for interlocking engagement with a link L'. As shown, this end of member K has the form of a nearly closed hook or eye and the links L' may be slightly flattened at m, whereby they may, at this point pass between the extremity M and the opposing central portion of member K. The projection M', however, is preferably elongated, and one end thereof is adapted to pass through the notch g, when the coupling member K is manipulated to the position in which it is illustrated in Fig. 4. Each of the extremities M and M' is so constructed and located with reference to the body of member K, that it cannot pass into engagement with the associated member, (i. e., the member F, or the link member L'), except when manipulated into such engagement by oscillating the hook member K out of any position which it will assume in use, under any ordinary conditions.

It will, of course, be understood that each end of the chain L will be provided with links L', and that at each end one of the hook links K will be employed to connect the end of the chain with the wheel, preferably through the medium of the co-acting members F, forming part of the clamping bolts E, and with means employed to prevent the clamping bolts from rotating, as above described. By mounting the coupling members F upon these clamping bolts, it is possible for me to use ordinary clamping plates, such as the plates A and B, which can be very easily and cheaply constructed. Further, these plates may be made sufficiently strong to better resist the strains imposed in use than the clamping bolts, and the strains are exerted upon both plates through the bolts, instead of being merely exerted upon one plate as has heretofore been the case. Therefore, as to that portion of the coupling which is mounted upon the spoke, or connected with the wheel, it may be assumed that any breakage or damage which may occur will occur in the clamping bolt itself. If the member F breaks from the clamping bolt, or if the bolt breaks at any point, this damaged part can be very easily and quickly replaced. A supply of bolts E may be carried with the car without materially adding to the load, or taking up much space in the tool box. The strains imposed upon the chain, links or the hook shaped coupling member K are largely lineal strains, and the form of these members is such that breakage is not likely to occur. The danger of accidental disengagement of the chain is practically eliminated, the chain being illustrated in Fig. 1 with full lines, indicating its normal position, and dotted lines indicating its position when the motion of the vehicle is reversed.

Another advantage afforded by the construction in Fig. 1 is that replacements can be easily made as above explained. If one of the bolts or one of the chain hooks should become jammed or damaged in such a way that the chain cannot be readily disengaged it is possible to remove the clamping members A and B from the spoke by unscrewing the nuts H on one or both of the clamping bolts. Ordinarily, however, it will be found that the damaged bolt may be readily removed.

As to the structure of the members A to K inclusive, as shown in Fig. 1, this application is a continuation of my former application Serial Number 163562, filed April 21, 1917.

I claim—

1. A coupling for anti-skid attachments for vehicle wheels comprising a member provided with a keyhole slot, a coöperating member having a hook-shaped extremity projected laterally and adapted to be manipulated through the keyhole slot when the projection is in line with the elongated portion of said slot, and means for securing said first-named member to a spoke of a wheel with the axis of the elongated portion of said slot extending substantially transversely of said spoke.

2. A coupling for anti-skid attachments for vehicle wheels comprising a pair of mutually engaging members, one having an aperture elongated in one direction, and the other being adapted to be manipulated through said aperture and having a lateral extension adapted, when in position for use, to span the aperture transversely to the axis of the elongated portion thereof and prevent accidental disengagement of the members, and means for securing said first-named member to a spoke of a wheel with the axis of the elongated portion of said aperture extending substantially transversely of said spoke.

3. A coupling for anti-skid attachments for vehicle wheels, comprising a pair of mutually engaging members, one of said members comprising a clamping bolt having a head portion provided with an aperture elongated substantially along the line of the axis of the bolt, and the other of said members having a hook shaped extremity provided with a cross head adapted to be manipulated through the aperture.

4. In an anti-skid attachment for vehicle wheels, the combination with a set of spoke engaging clamping members, of a set of clamping bolts therefor, adapted to be held against rotation by said clamping members and having flattened apertured heads supported in oblique positions with their flat faces inclined toward the sides of the felly from their inner margins, and coöperating hook shaped members having cross heads each adapted in one position to pass through said apertures,—said apertures being elongated in one direction to permit such manipulation.

5. In an anti-skid attachment for vehicle wheels, the combination with a set of spoke engaging clamping plates, of a set of clamping bolts therefor adapted to be held against rotation by said clamping plates and each having a head provided with an aperture elongated in the length of the clamping bolts, and coöperating hook shaped members the extremities of which are provided with cross heads adapted to be manipulated through said apertures.

6. The combination with a vehicle wheel of an elongated member having an opening in one end thereof, means for securing said member to said wheel substantially parallel with the side face of the felly of said wheel and with the end provided with said opening spaced from said felly to form a clearance space between said end and said felly, and an anti-skid chain having a coupling member at one end passing through said opening to detachably secure said chain to said member, said coupling member extending through said clearance space.

7. The combination with a vehicle wheel of an elongated member, means for securing said member to said wheel substantially parallel with the side face of the felly of said wheel and with one end spaced from said felly to provide a clearance space between said end and said felly, and a flexible anti-skid member having a portion extending through said clearance space and secured to said end.

In testimony whereof I affix my signature in the presence of two witnesses.

WILLIAM H. KRUG.

Witnesses:
O. C. WEBER,
ALICE J. McKERIHAN.